(12) United States Patent
Hoyos

(10) Patent No.: US 7,400,348 B2
(45) Date of Patent: Jul. 15, 2008

(54) REMOTE CONTROLLED IMAGING SYSTEM

(76) Inventor: Carlos A. Hoyos, 22650 Victory Blvd., Woodland Hills, CA (US) 91367

( * ) Notice: Subject to any disclaimer, the term of this patent is extended or adjusted under 35 U.S.C. 154(b) by 315 days.

(21) Appl. No.: 09/854,764

(22) Filed: May 14, 2001

(65) Prior Publication Data

US 2002/0008759 A1  Jan. 24, 2002

Related U.S. Application Data

(63) Continuation-in-part of application No. 09/295,470, filed on Apr. 19, 1999, now abandoned.

(60) Provisional application No. 60/203,818, filed on May 12, 2000, provisional application No. 60/085,674, filed on May 15, 1998.

(51) Int. Cl.
*H04N 5/232* (2006.01)

(52) U.S. Cl. .............................. 348/211.99; 348/211.4

(58) Field of Classification Search ............ 348/211.99, 348/211.1, 211.2, 211.3, 211.4, 211.5, 211.6, 348/211.7, 211.8, 211.9, 211.11, 211.12, 348/211.13, 211.14, 143, 144, 159

See application file for complete search history.

(56) References Cited

U.S. PATENT DOCUMENTS 5,184,521 A * 2/1993 Tyler ........................... 74/5.34
6,034,722 A * 3/2000 Viney et al. .................. 348/135
6,097,441 A * 8/2000 Allport ........................ 348/552

* cited by examiner

*Primary Examiner*—Tuan Ho
*Assistant Examiner*—Justin P Misleh

(57) ABSTRACT

A remote control imaging system includes an independently controlled imaging platform controlled by a camera operator. A telecontrol unit includes a video preview monitor, camera and trim controls and an interface for attachment of a conventional camera control handle to permit selection of telecontrol zoom, iris, focus and camera on/off controls. An imaging platform is capable of motion about three orthogonal axes independent of the motion or control of a support vehicle, such as a crane or helicopter. The imaging platform may also accommodate rapid interchange of a variety of imaging devices using a standardized three point securing system, which may also isolate vibration from the support vehicle.

33 Claims, 10 Drawing Sheets

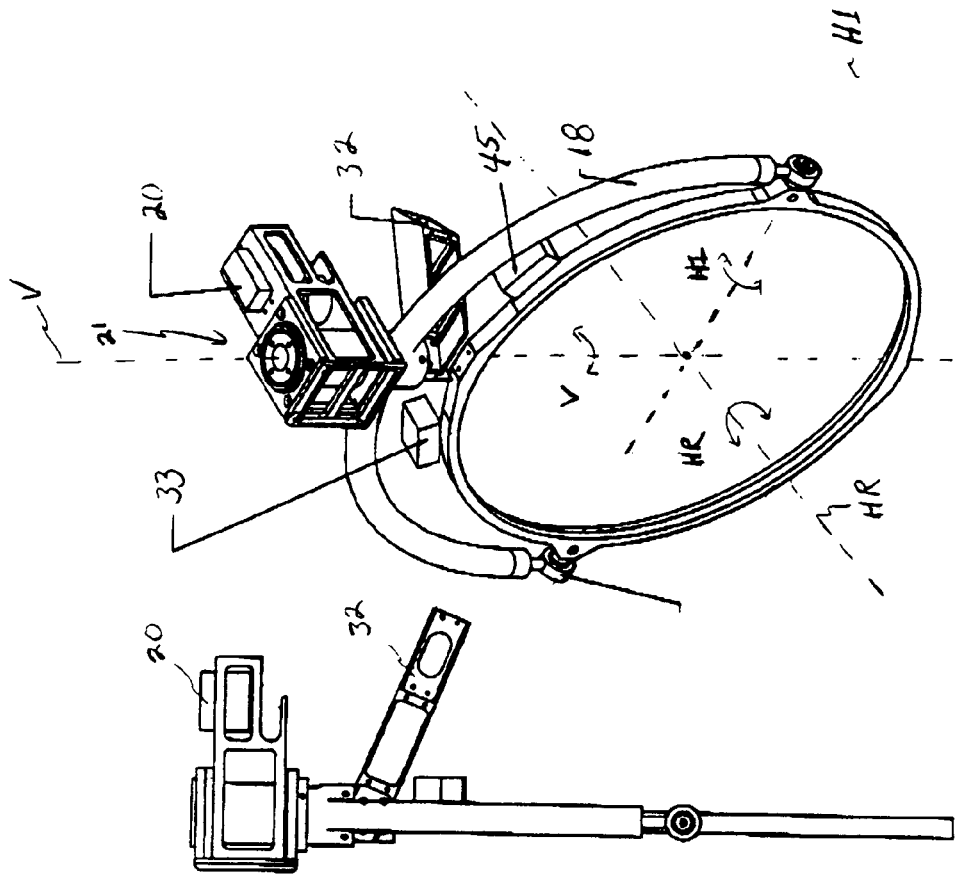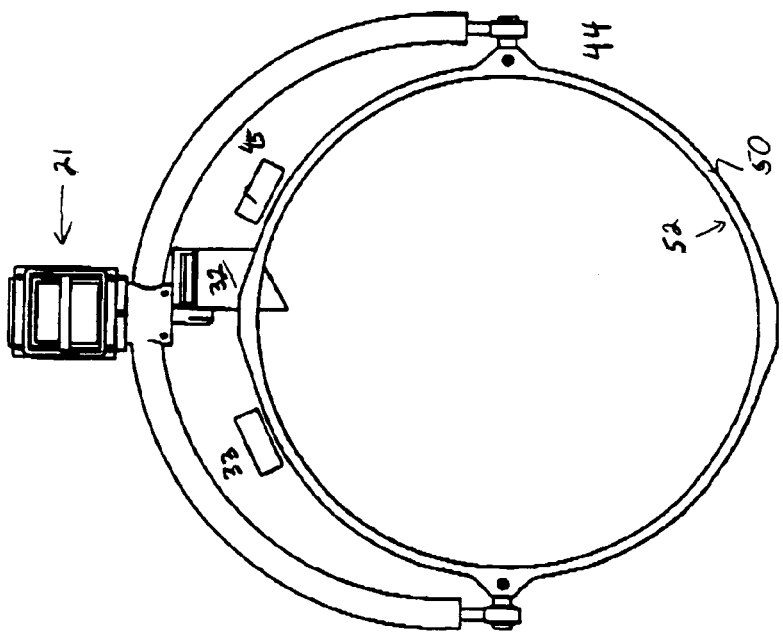

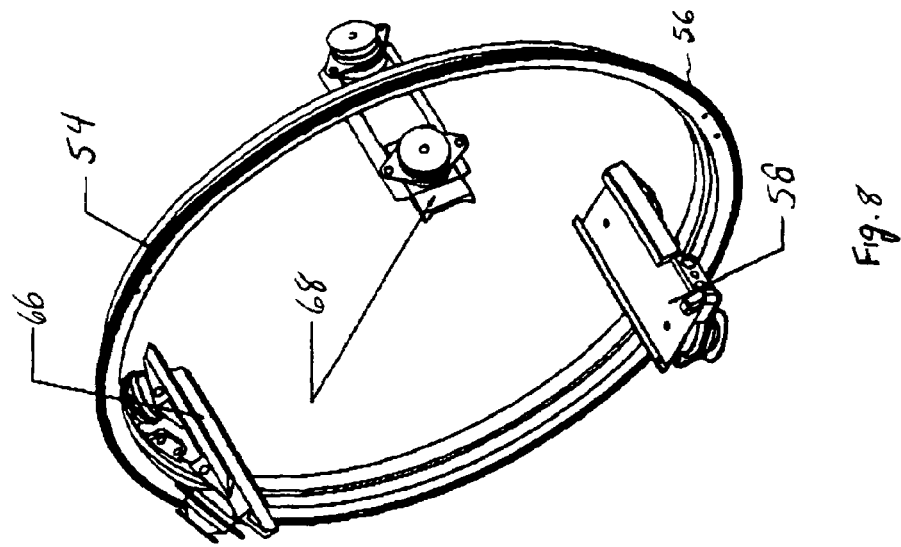
Fig. 8
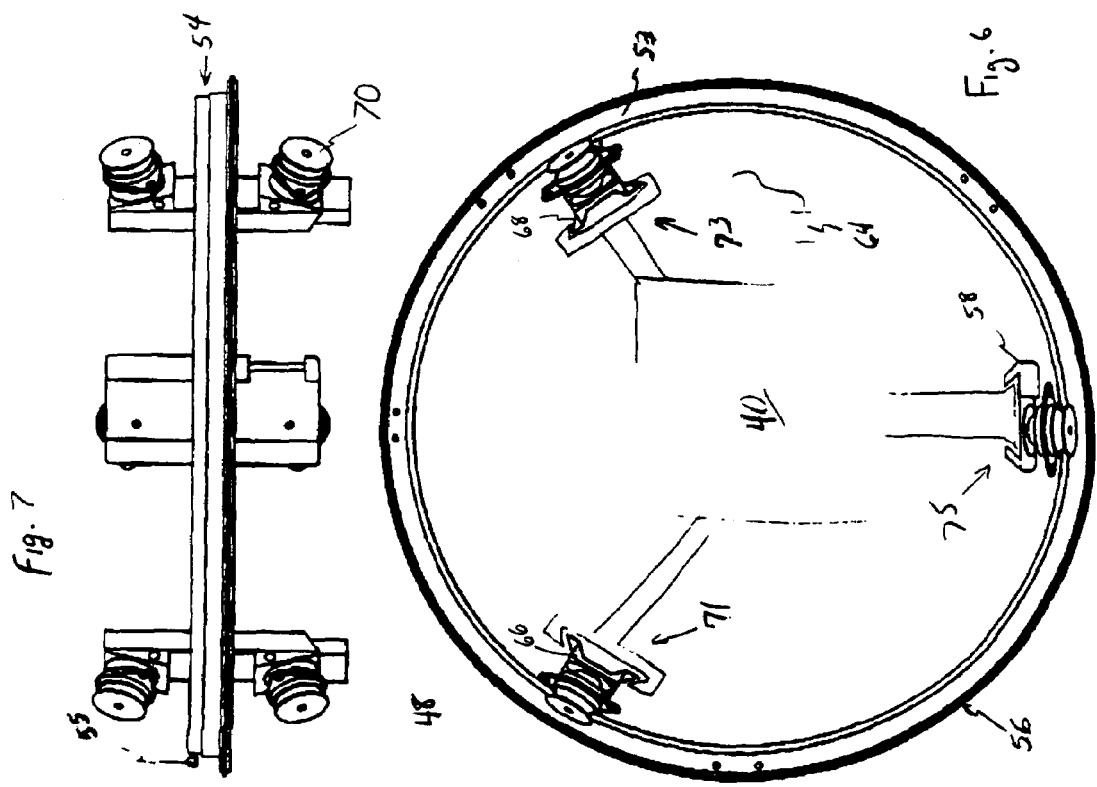
Fig. 7
Fig. 6

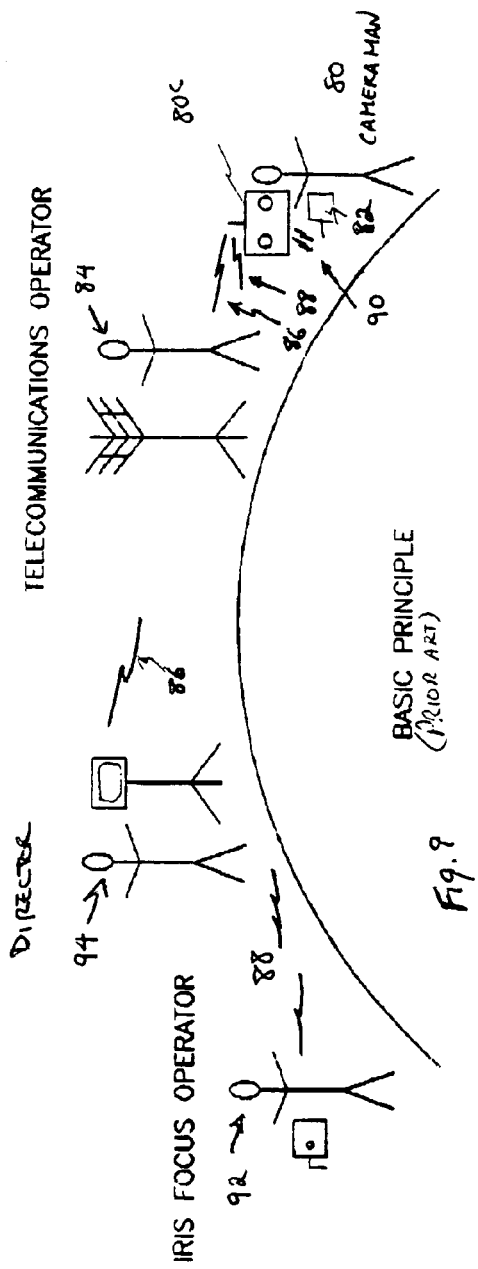
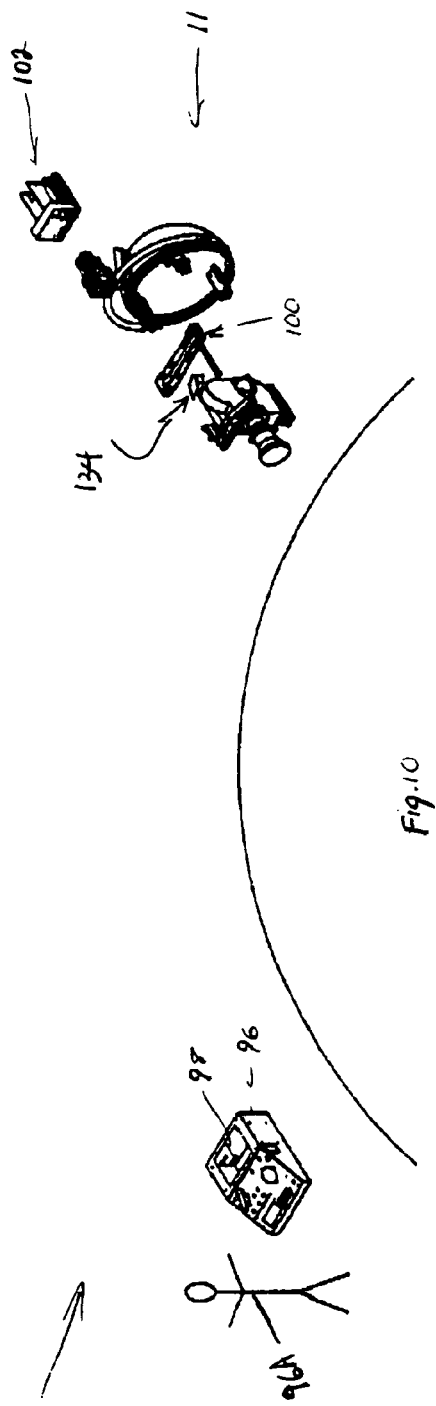

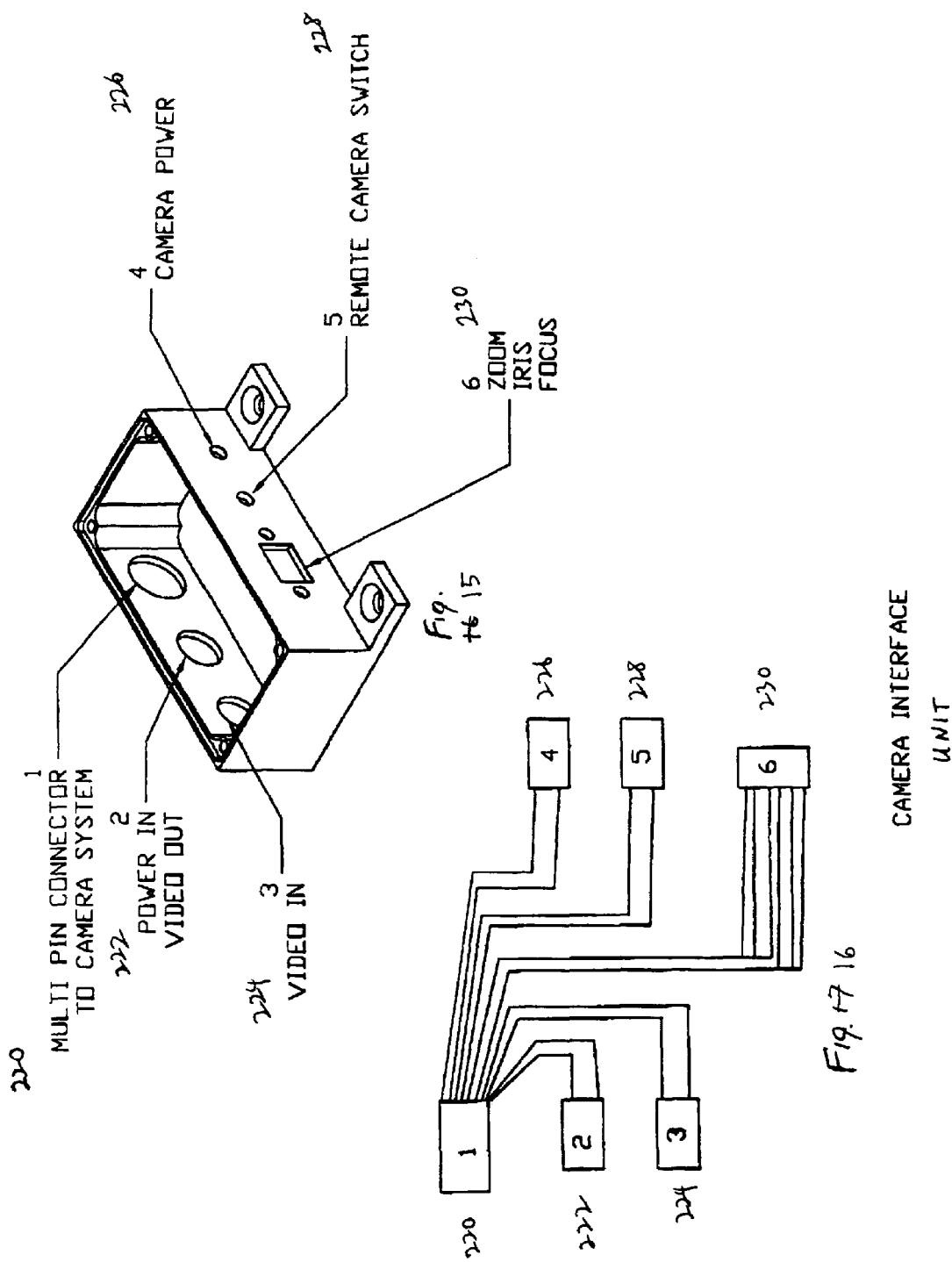

REMOTE CONTROLLED IMAGING SYSTEM

RELATED APPLICATIONS

This application claims the priority of U.S. provisional patent application Ser. No. 60/203,818 filed May 12, 2000, and is a continuation-in-part of U.S. application Ser. No. 09/295,470 filed Apr. 19, 1999, now abandoned, which claims the priority of U.S. provisional patent application Ser. No. 60/085,674 filed May 15, 1998.

FIELD OF THE INVENTION

This invention relates to remote controllers, and more specifically to video feedback remote controllers for remote camera operation.

DESCRIPTION OF THE PRIOR ART

Production of entertainment has included using cameras to capture ever more difficult pictures. Remotely operated cameras have been used and have required a support crew of several people and much equipment.

What is needed is a method and apparatus for operating remote cameras and other imaging devices with a minimum of operators and equipment.

SUMMARY OF THE INVENTION

In a first aspect, the present invention provides a telecontrol unit combining a video monitor and or a television tuner, an imaging platform orientation control joystick, imaging device iris and zoom controls, and recording, auto-stabilization control, and telecommunications modules. The telecontrol unit may be battery powered and portable, be sized to be carried and operated by one person, and include an operator support piece. The telecontrol unit may also include a programming display and controls, and a docking bay for video receivers.

The telecontrol unit may further include fine adjustment controls to permit very accurate in-field adjustment of each control and selectable response speed controls, permitting for example a roll to be accomplished at six degrees per second or three degrees per second depending on the speed selection switch setting. Each axis may have independently selectable speeds and the speeds or gear ratios may vary also.

In another aspect, the present invention includes a selectable interface to permit connection of a conventional camera control handle to the telecontrol unit. The interface may permit the handle to control main system functions in addition to or in lieu of the telecontrol unit controls.

In still another aspect, the present invention includes a modular camera system control unit. The camera system control unit may be connected to an imaging platform to provide a modular interface between a telecontrol unit as previously described and an imaging device secured to the imaging platform. The camera system control unit may include multiple independent channels of operation, battery level and operation time displays, and proportional control outputs. The camera system control unit may also include one or more override selectors to permit locking one or more axes of movement of the imaging platform without damaging the motion control drivers. The camera system control unit may further include gyroscopic stabilization elements to control one or more of the axes of motion of the imaging platform.

In still another aspect, the present invention includes a modular camera interface unit. The camera interface unit permits a modular interface between a camera system control unit and different imaging devices. The camera interface unit may include interfacing for recording, zoom, iris, and focus functions and industry standard video inputs and outputs.

In still another aspect, the present invention includes a universal adapter for connection of the imaging platform to a variety of conventional imaging platform support devices such as automobiles, helicopters, booms, cranes and other suitable devices.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 3 is a front view of the pan, tilt and roll control elements of an imaging system according to the present invention.

FIG. 4 is a side view of the imaging system elements of FIG. 3.

FIG. 5 is an isometric view of the imaging system elements of FIG. 3 showing three axes of rotation.

FIG. 6 is a front view of roll control elements and imaging device mounts according to the present invention.

FIG. 7 is a top view of the imaging system elements of FIG. 6.

FIG. 8 is an isometric view of the imaging system elements of FIG. 6.

FIG. 9 is a block diagram of a conventional remote imaging system.

FIG. 10 is a block diagram of a remote imaging system according to the present invention.

FIG. 15 is an isometric view of a camera interface unit according to the present invention.

FIG. 16 is an electrical block diagram of a camera interface unit according to the present invention.

DETAILED DESCRIPTION OF THE PREFERRED EMBODIMENT(S)

Figure 1:
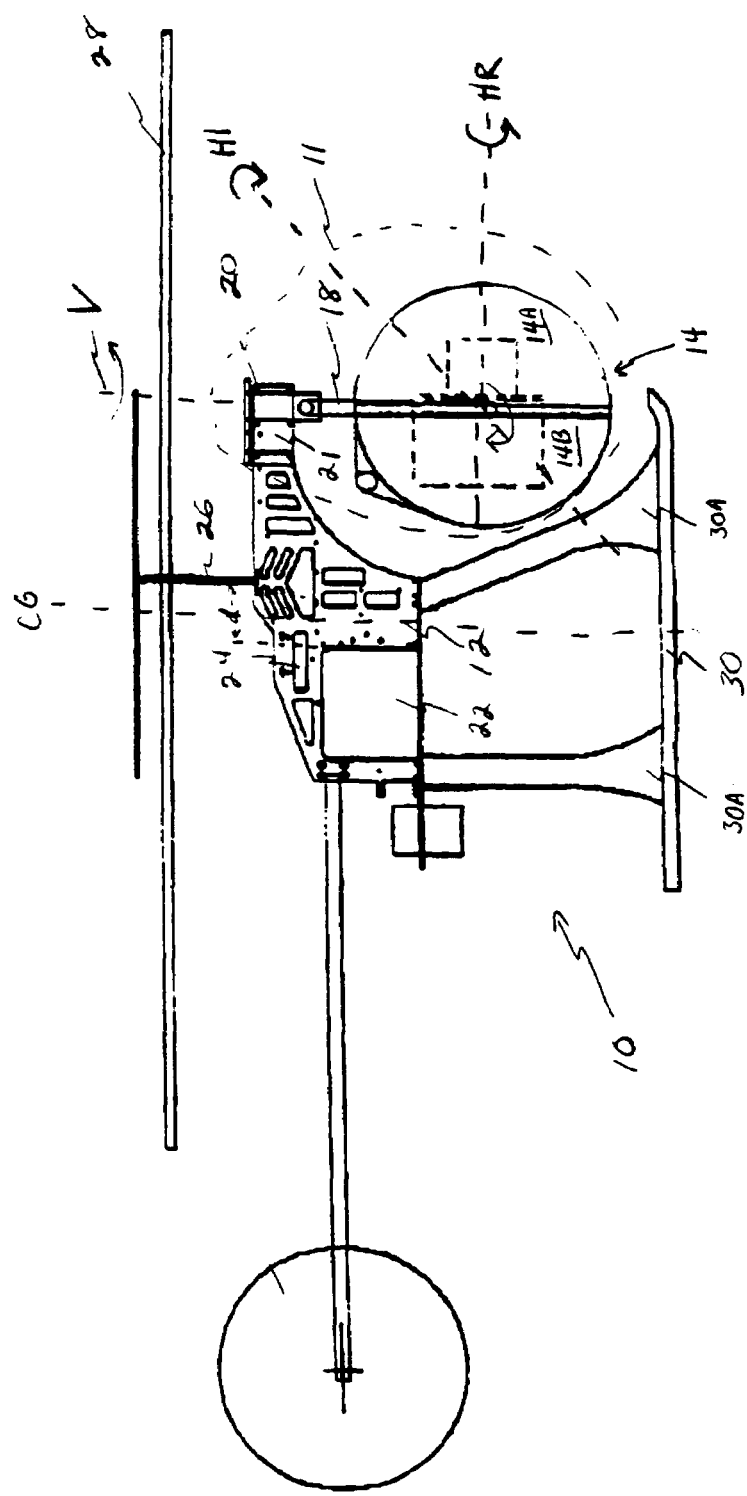
FIG. 1 is a side view of a remote control camera platform supported on a helicopter in accordance with the present invention.

Referring now to FIG. 1, in an embodiment of the present invention, remote controlled model helicopter 10 is shown in a side view without a plastic cover or fairing often used to make the platform look more like a real helicopter in miniature. Remote controlled model helicopter 10 includes especially modified frame 12 to support imaging system 11 at attachment 21.

In a currently preferred embodiment of the present invention camera ball 14 includes two portions, movable shell 14A and fixed shell 14B. Camera ball 14 is secured by yoke 18. Rotation of yoke 18 about vertical axis V is controlled by pan motor and gearing unit 20 mounted on frame 12. Pan motor and gearing unit 20 may be of conventional design and operated by a conventional remote controlled radio system, not shown. Operation of pan motor and gearing unit 20 causes camera ball 14 to be rotated about vertical axis V in the pan mode. Camera ball 14 may similarly be operated for motion around a horizontal tilting axis H1 or a perpendicular horizontal roll axis HR as will be described in more detail below.

Remote controlled model helicopter 10 includes gasoline or other conventional engine 22 mounted to frame 12 and coupled by drive unit 24 to drive shaft 26 of main rotor 28.

Frame 12 is supported on skids 30 which elevate frame 12 high enough above the ground when helicopter 10 is landed so that camera ball 14 doesn't contact the ground even during a relatively rough landing. Distance d between engine 22 and drive shaft 26 may be adjusted, with regard to vertical axis V for pan rotation and mounting of ball 14, so that the center of gravity CG of helicopter 10 is positioned substantially between legs 30A of skids 30 to provide a stable landing platform for helicopter 10.

Conventional helicopter control devices, such as gyros, may be included with helicopter 10 to control both the direction and stability of flight as well as the direction and stability of ball 14. In a currently preferred embodiment of the present invention, imaging system 11 may be controlled independent of the flight controls for helicopter 10. Movement of imaging system 11 about axes V, H1 and HR may also be subject to gyroscopic control. In a currently preferred embodiment of the present invention only movement about horizontal axis HR is controlled by a gyro.

Figure 2:
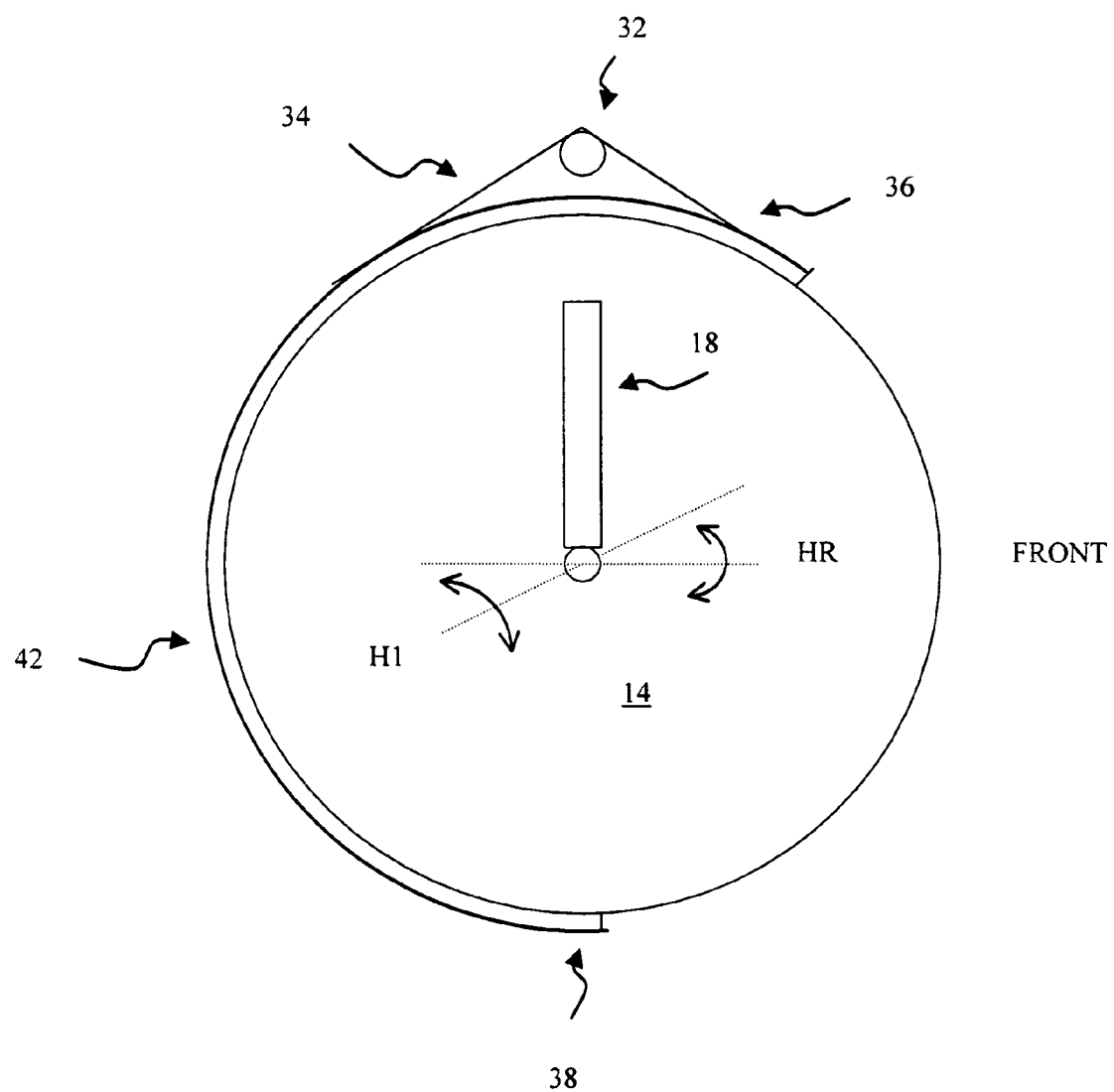
FIG. 2 is a side view of the remote control camera platform ball shown in FIG. 1.

Referring now to FIG. 2, the control mechanisms of ball 14 are shown in greater detail. In addition to rotation about vertical axis V for panning motion, as described above, ball 14 rotates about horizontal axis H1, through the mounting axis between ball 14 and yoke 18, for tilting motion. The tilting motion is controlled by gear motor assembly 32 to drive belt 34 affixed to ball 14 at mounting locations 36 and 38. Clockwise rotation of gear motor assembly 32 causes the portion of belt 34 in contact therewith to move to the right. This causes ball 14 to also rotate clockwise resulting in downward tilting of ball 14. Similarly, counterclockwise rotation of gear motor assembly 32 causes counterclockwise rotation resulting in upward tilting of ball 14.

Mounting locations 36 and 38 are mounted at opposite ends of belt 34 as much as 270° apart so that ball 14 may be moved in a range of tilt motion substantially more than 90° downward below the horizontal. In particular, ball 14 may be tilted downward so that an imaging device 40 such as camera may be aimed toward the back of helicopter 10. In order to facilitate tilting motion around horizontal axis H1, track 42 may be mounted to ball 14 along the expected points of contact between belt 34 and the upper surface of ball 14.

In addition to rotation about vertical axis V for panning motion and horizontal axis H1 for tilting, as described above, ball 14 rotates about horizontal axis HR for rolling motion.

Referring now additionally to FIGS. 3-8, this third degree of rotation of ball 14 is provided by roll gear drive and assembly 44, which includes servo 45, drive belt 46 (not shown), and bearing assembly 48 to which an imaging device 40, such as a camera, is mounted. The outer most ring 50 of roll gear drive and assembly 44 is mounted to fixed shell 14B and includes outer race 52, gyro 33, and servo 45. Bearing assembly 48 includes inner ring 53, inner race 54 and gear 56. Inner race 54 of bearing assembly 48 may be fitted to outer race 52 of roll gear drive and assembly 48 in any conventional manner such as rollers or ball bearings 55. Servo 45 controls roll motion of imaging device 40 by driving gear 56 with belt 46.

In particular, clockwise rotation of belt 46 causes clockwise rotation of gear 56 and therefore results in clockwise rotation of bearing assembly 48.

Alternatively, servo 45 and gear 56 may be any suitable drive mechanism, such as a mesh gear type drive. In this embodiment, clockwise rotation of servo 45 causes counterclockwise rotation of gear 56 and therefore counterclockwise rotation of bearing assembly 48.

In accordance with one aspect of the present invention, roll and tilt motions of ball 14 are coordinated so that tilting ball 14 towards the rearward direction causes sufficient roll in the mounting of imaging device 40 so that left and right directions are preserved. For example, if helicopter 10 is moving in straight and level flight with imaging device 40 pointed directly forward, at the neutral or horizontal position, an object to the left of helicopter 10 would appear to the left as seen by imaging device 40. Tilting of camera 40 more than 90° downward causes imaging device 40 to point towards the rear of helicopter 10. If no roll motion were applied, an object to the left of helicopter 10 would appear to be in the reverse position, i.e., would appear to be to the right of helicopter 10. A coordinated roll motion of 180° is applied so that when imaging device 40 is pointed towards the rear of helicopter 10, an object to the left of helicopter 10 is also viewed by imaging device 40 to be to the left of helicopter 10.

Referring now specifically to FIGS. 6-8, imaging device 40, such as a camera, may be conveniently supported by a minimum number of contact points to minimize the effects of vibration. In a currently preferred embodiment of the present invention three or more points, such as points 71, 73, and 75, are used to support an imaging device 40. Points 71, 73, and 75 are secured to movable shell 14A which is secured to inner ring 53. For convenience in the use of many different imaging devices, an imaging device may conveniently be removably mounted at points 71, 73, and 75 by means of a base slide 58 and slides 66 and 68 which may be similar to conventional camera mounting shoes. Similarly, a standardized electrical connector, such as connector 64, may be mounted to fixed shell 14B or otherwise available in the central opening of ball 14 for connections to provide electrical power, command signals and video or other imaging signals.

Slides 58, 66 and 68 may be vibrationally isolated and also secured to movable shell 14A by one or more isolation connectors such as isolation connector 70. In a currently preferred embodiment of the present invention, two vibration isolation connectors such as isolation connector 70 are used to secure each slide 58, 66 and 68 to movable shell 14A. The range of vibration frequency shielding provided by vibration isolation connectors such as isolation connector 70 is selected to cover the natural oscillation frequencies of the imaging device or devices used.

Referring now to FIG. 9, in a conventional remote camera arrangement, four or more operators may be used to control all aspects of an image and its capture. Cameraman 80 is in control of camera 80C using remote controller 82. Telecommunications operator 84 may manage telecommunications links 86, 88 and 90. One or more auxiliary operators, such as iris operator 92, may also be included. Telecommunications link 86 may be used to enable director 94 to preview the images captured by camera 80C.

Referring now to FIG. 10, in a currently preferred embodiment of the present invention, operator 96A and telecontrol unit 96 may be used to replace the operators and equipment shown in FIG. 9. Telecontrol unit 96, which has a video monitor 98, may be used to remotely operate imaging system 11. Imaging system 11 may also include camera system control unit 100, camera interface unit 134 and or universal adapter 102.

Figure 11:
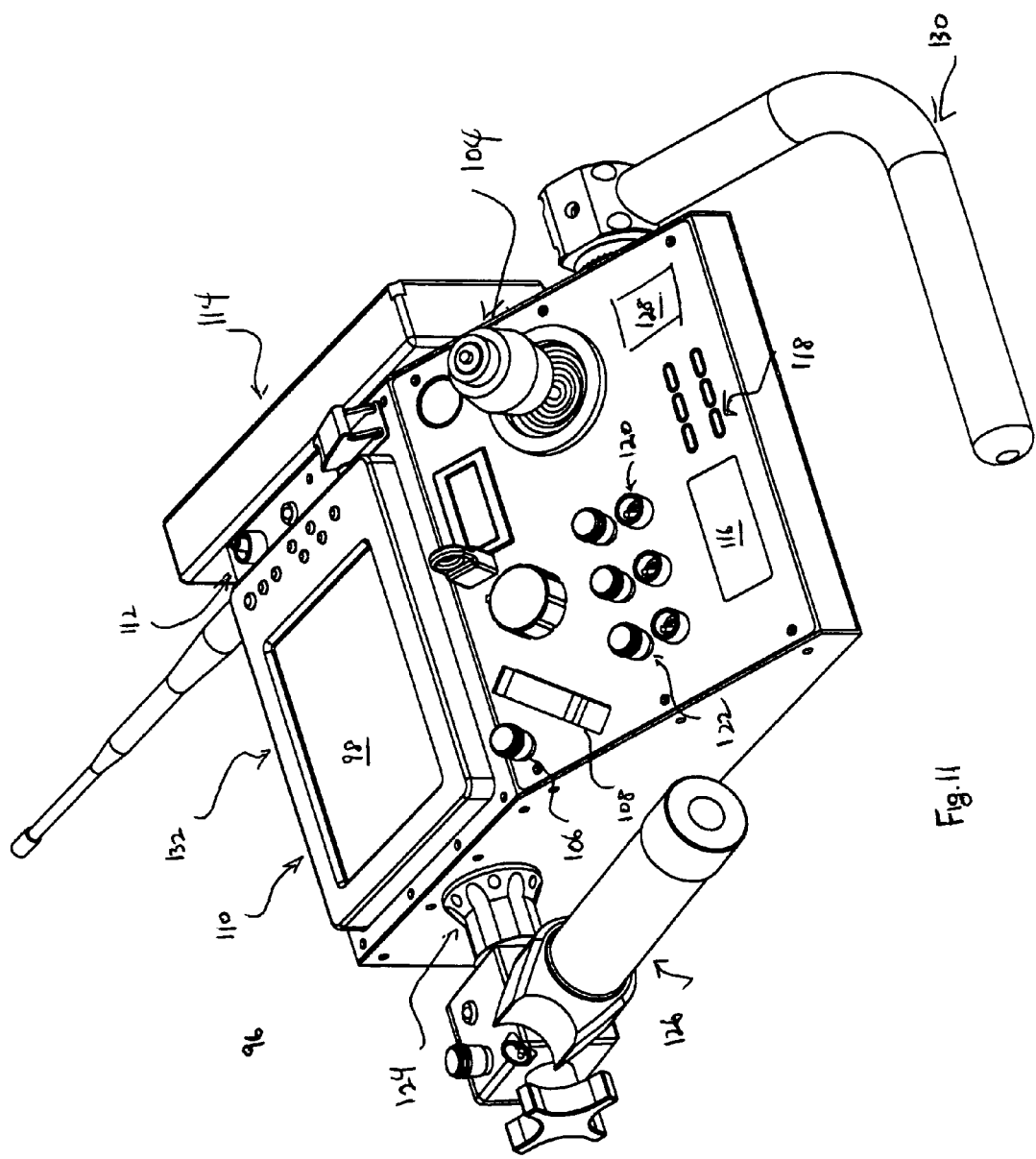
FIG. 11 is an isometric view of a telecontrol unit according to the present invention.

Referring now to FIG. 11, telecontrol unit 96 may combine video monitor 98 and or a television tuner, an imaging platform orientation control joystick 104, imaging device iris and zoom controls 106 and 108 respectively, recording module 110, auto-stabilization control module 112 and telecommunications module 114. Zoom and record functions may be decoupled from telecontrol unit 96 and controlled by an industry standard unit. On-board communication package 128 allows interaction between operator 96A and other personnel. For example, video monitor 98 display may be communicated to director 94. Telecontrol unit 96 may be battery powered and portable, be sized to be carried and operated by one person, and include operator support piece 130. Telecontrol unit 96 may also include programming display 116 and programming controls 118. Telecontrol unit 96 may further include docking bay 132, as an internal or external interface, for additional or different video receivers in parallel or series.

Each control may further include fine adjustment controls 120 to permit very accurate in-field adjustment of each control. In addition to the imaging platform orientation control joystick, selectable response speed control 122 may provide further imaging platform control, permitting for example a roll to be accomplished at six degrees per second or three degrees per second depending on the speed selection switch setting. Each axis may have independently selectable speeds and the speeds or gear ratios may also vary.

In one aspect of the present invention, a selectable interface 124 permits connection of conventional camera control handle 126 to the telecontrol unit 96. Interface 124 allows conventional camera control handle 126 to control main system functions in addition to or in lieu of telecontrol unit 96 controls.

Figure 12:
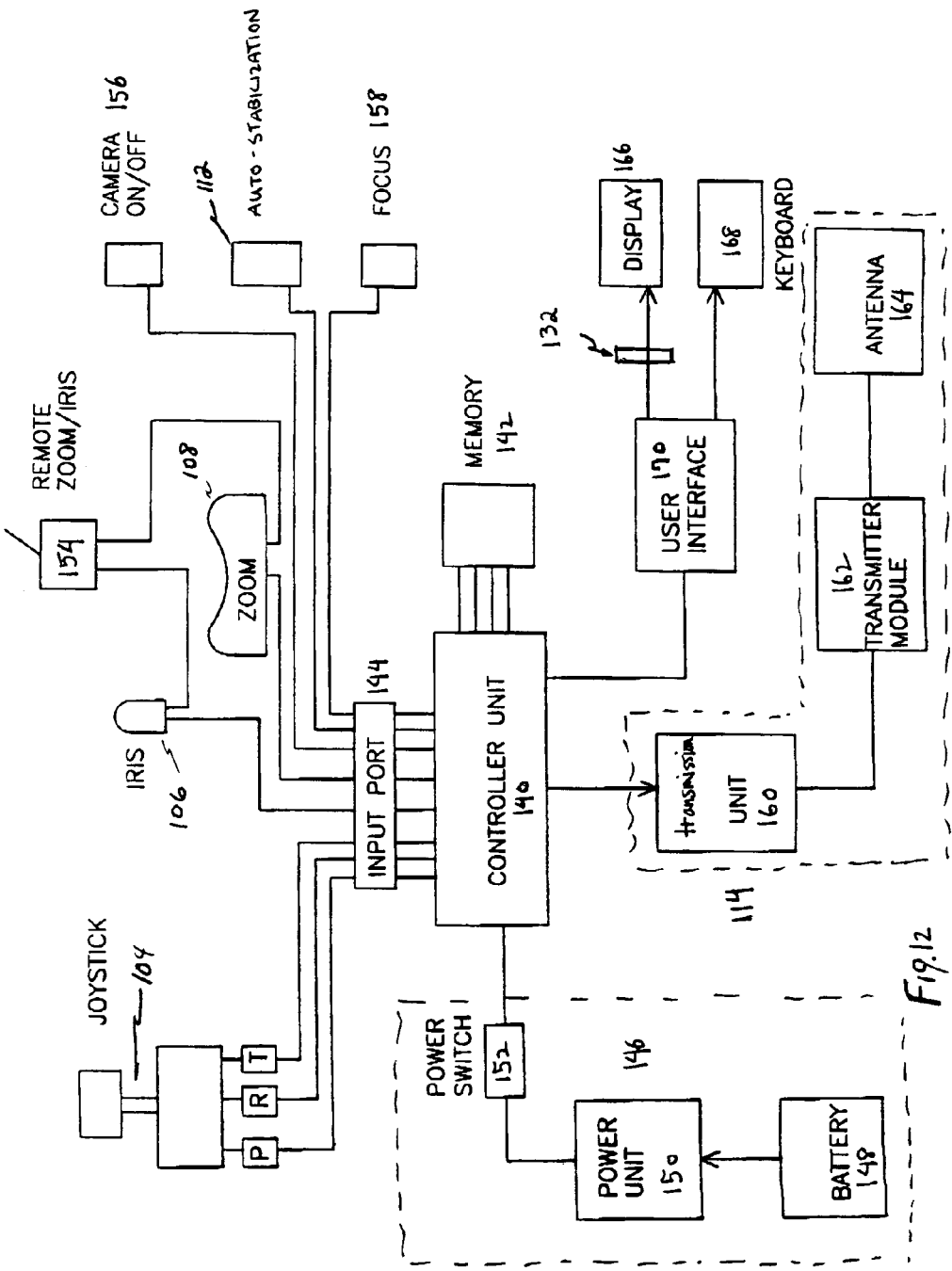
FIG. 12 is a block diagram of the components of a telecontrol unit according to the present invention.

Referring now to FIG. 12, telecontrol unit 96 system includes a controller unit 140 coupled to memory 142, input port 144, and power source 146. Input port 144 connects to imaging platform orientation control joystick 104, imaging device iris control 106, imaging device zoom control 108, remote zoom/iris control 154, imaging device on/off control 156, imaging device focus control 158, and auto-stabilization control module 112. Power source 146 may be a battery 148 connected to power unit 150 connected to power switch 152. Controller unit 140 is also coupled to telecommunication module 114 comprised of transmission unit 160, transmitter module 162, and antenna 164. Controller unit 140 is further coupled to display 166 and keyboard 168 via user interface 170.

Another aspect of the present invention includes a modular camera system control unit 100. Camera system control unit 100 may be connected to an imaging platform to provide a modular interface between a telecontrol unit 96 as previously described and an imaging device 40 secured to the imaging platform. Camera system control unit 100 may include multiple independent channels of operation, battery level and operation time displays, and proportional control outputs. Camera system control unit 100 may also include one or more override selectors to permit locking one or more axes of movement of the imaging platform without damaging the motion control drivers. Camera system control unit 100 may further include gyroscopic stabilization elements to control one or more of the axes of motion of the imaging platform.

Figure 13:
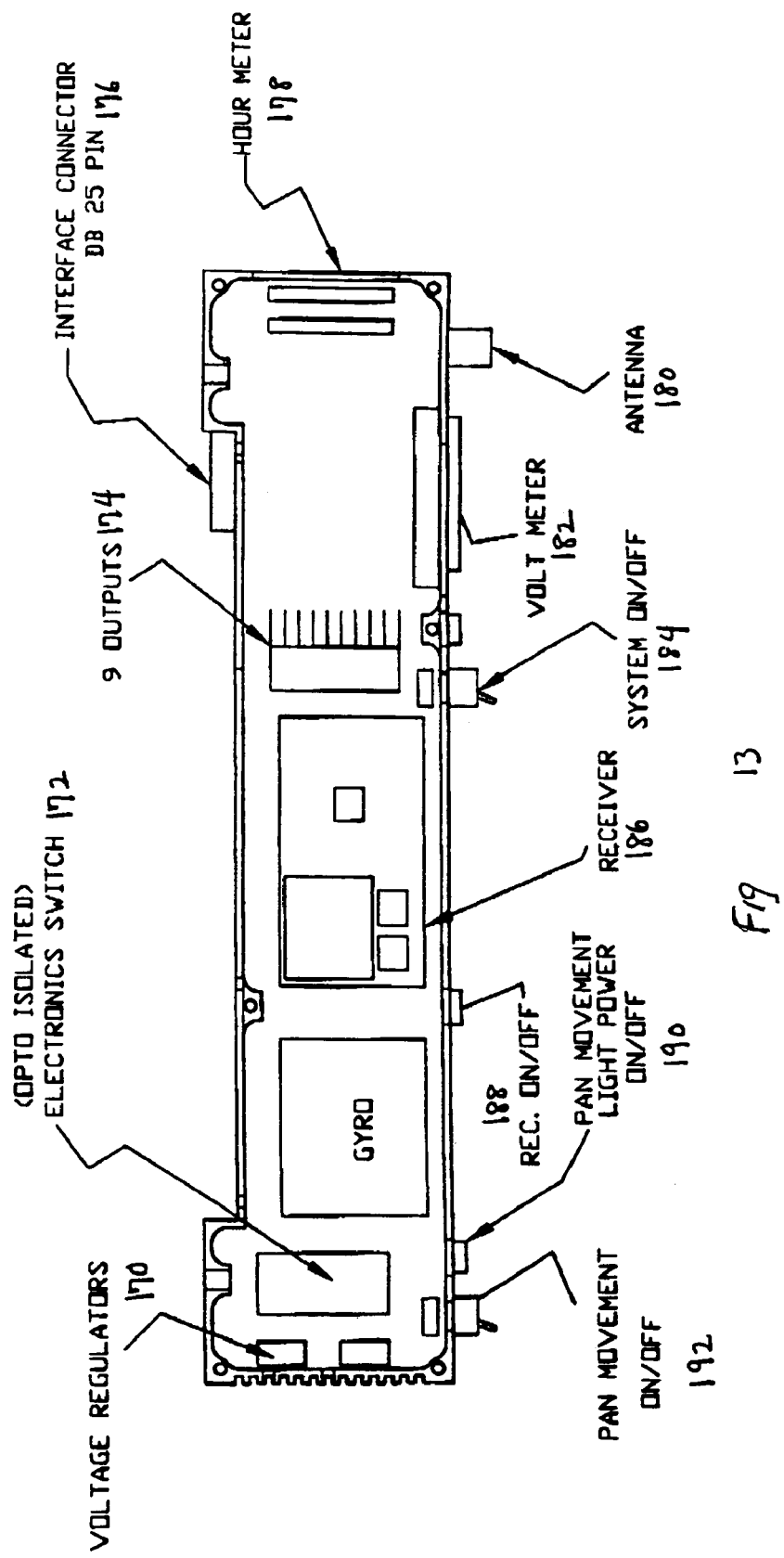
FIG. 13 is a top view of a camera system control unit according to the present invention.

Referring now to FIG. 13, the on-board components of camera system control unit 100 including voltage regulator 170, electronics switch 172, outputs 174, interface connector 176, hour meter 178, antenna 180, volt meter 182, system on/off 184, receiver 186, record on/off 188, pan movement Light power on/off 190, and pan movement on/off 192.

Figure 14:
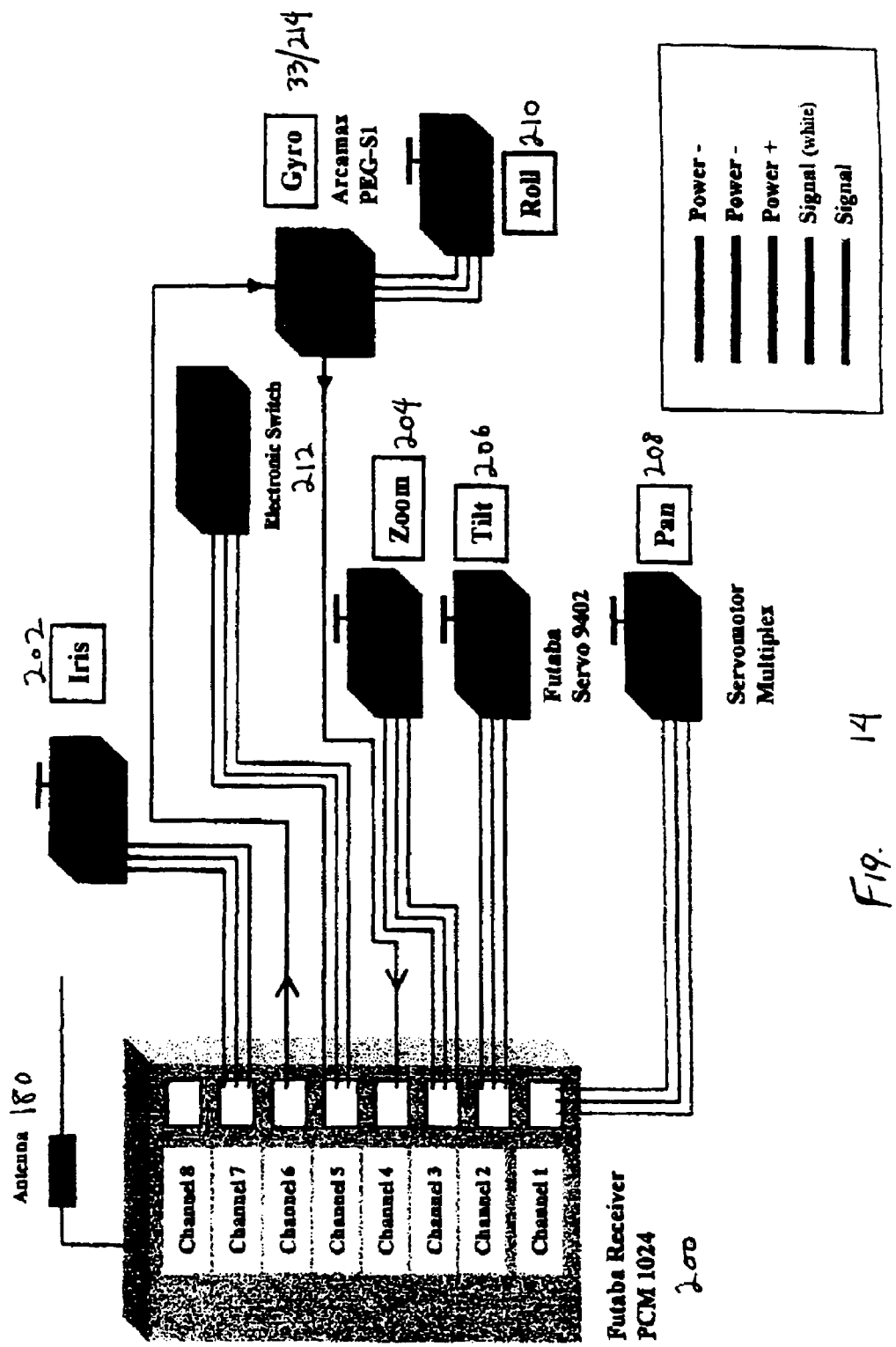
FIG. 14 is an electrical block diagram of a camera system controller according to the present invention.

Referring now to FIG. 14, the electrical connections of camera system control unit 100 include multi-channel receiver 200, such as a Futaba Receiver PCM 1024, coupled to antenna 180, iris and zoom controllers 202 and 204 respectively, and electronic switch 212. Multi-channel receiver 200 is also coupled to tilt controller 206, such as a Futaba Servo 9402, and pan controller 208, such as a Servomotor Multiplex. Multi-channel receiver 200 is further coupled to a gyro 214, such as Arcamax PEG-S1, which is connected to roll controller 210.

Another aspect of the present invention includes a modular camera interface unit 134. Camera interface unit 134 may be connected to camera system control unit 100 to provide a modular interface for different imaging devices. Camera interface unit 134 may include electronics to interface recording, zoom, iris and focus functions. Camera interface unit 134 may also include video inputs and outputs according to common industry standards.

Referring now to FIG. 15, the box of camera interface unit 134 includes opening for multi-pin connector 220, power inlvideo out 222, video in 224, camera power 226, remote camera switch 228, and zoomliris/focus 230.

Referring now to FIG. 16, the multi-pin connector 210 of camera interface unit 134 is coupled to power inlvideo out 222, video in 224, camera power 226, remote camera switch 228, and zoomliris/focus 230.

Another aspect of the present invention includes a universal adapter 102 for connection of the imaging platform to a variety of conventional imaging platform support devices such as automobiles, helicopters, booms, cranes and other suitable devices.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A remote control imaging system comprising:
   an imaging platform connected to a support vehicle in which the imaging platform is capable of controllable motion about three orthogonal axes;
   an imaging device attached to the imaging platform;
   a telecontrol unit capable of being controlled by one operator, having a video display for displaying an output of the imaging device, one or more imaging platform motion controls, at least one of an iris controller, a zoom controller, and a focus controller for the imaging device, a selectable response speed control to control the speed of motion of the imaging platform about the three orthogonal axes, in which said telecontrol unit controls the movement of the imaging platform independent of flight control for said support vehicle;
   a camera control handle fixed to the telecontrol unit, in which the camera control handle is capable of controlling the one or more imaging platform motion controls, the iris controller, the zoom controller, the focus controller, and an imaging device on/off control, in which said camera control handle can be used in addition to or in lieu of the telecontrol unit.

2. The system of claim 1 further comprising: a camera system control for providing wireless interconnection between the imaging device and the telecontol unit, the camera system control having multiple independent channels of operation for at least one of iris, zoom, and focus controller, and proportional control outputs to the imaging device.

3. The system of claim, 2 further comprising: a camera interface for connecting the imaging device and the camera system control.

4. The system of claim 1 further comprising: a universal adapter for connecting the imaging platform to a variety of support device.

5. The system of claim 1 wherein the telecontrol unit further comprises:
a video receiver interface.

6. The system of claim 5 wherein the video receiver interface further comprises: an external video receiver interface.

7. The system of claim 5 wherein the video receiver interface further comprises: multiple video receivers, in parallel or series.

8. The system of claim 5 wherein the video receiver interface further comprises: an exchangeable video receiver.

9. The system of claim 1 wherein the one or more imaging platform motion control further comprises: a joystick.

10. The system of claim 1 wherein the one or more imaging platform motion control further comprises: a selectable response speed controller.

11. The system of claim 1 wherein the at least one of the iris controller, the zoom controller, and the focus controller further comprises: a corresponding fine adjustment controller.

12. The system of claim 1 wherein the telecontrol unit further comprises: an independent power source.

13. The system of claim 12 wherein the independent power source further comprises: one or more batteries.

14. The system of claim 1 wherein the video display further comprises:
a video monitor.

15. The system of claim 1 wherein the video display further comprises:
a television tuner.

16. The system of claim 1 wherein the telecontrol unit further comprises: a programming display and control.

17. The system of claim 1 wherein the telecontrol unit further comprises: an on-board communication package allowing interaction between a remote control operator and other personnel.

18. The system of claim 1 wherein the telecontrol unit further comprises: a wireless connection to at least one of the imaging device or imaging.

19. A device for use in a conventional arrangement for remotely operating an imaging device, an imaging platform capable of motion, and a support vehicle, including a plurality of operators and operating equipment, wherein the device comprises:
a remote control having a video display for displaying an output of the imaging device, one or more imaging platform motion controls, at least one of an iris controller, a zoom controller, and a focus controller for the imaging device, a selectable response speed control to control the speed of motion of the imaging platform about three orthogonal axes, in which said remote control controls movement of the imaging platform independent of flight control for said support vehicle;
a camera control handle fixed to the remote control, in which the camera control handle is capable of controlling the one or more imaging platform motion controls, the iris controller, the zoom controller, the focus controller, and an imaging device on/off control, in which said camera control handle can be used in addition to or in lieu of the remote control.

20. The device of claim 19 wherein the remote control further comprises: a video receiver interface.

21. The device of claim 20 wherein the video receiver interface further comprises: an external video receiver interface.

22. The device of claim 20 wherein the video receiver interface further comprises: multiple video receivers, in parallel or series.

23. The device of claim 20 wherein the video receiver interface further comprises: an exchangeable video receiver.

24. The device of claim 19 wherein the one or more imaging platform motion control further comprises: a joystick.

25. The device of claim 19 wherein the one or more imaging platform motion control further comprises: a solectabic response speed controller.

26. The device of claim 19 wherein the at least one of the iris controller, the zoom controller, and the focus controller further comprises: a corresponding fine adjustment controller.

27. The device of claim 19 wherein the remote control further comprises: an independent power source.

28. The device of claim 27 wherein the independent power source further comprises: one or more batteries.

29. The device of claim 19 wherein the video display further comprises: a video monitor.

30. The device of claim 19 wherein the video display further comprises: a television tuner.

31. The device of claim 19 wherein the remote control further comprises: a programming display and control.

32. The device of claim 19 wherein the remote control further comprises: an. on-board communication package allowing interaction between a remote control operator and other personnel.

33. The device of claim 19 wherein the remote control further comprises: a wireless connection to at least one of the imaging device or imaging platform.

* * * * *